US012031844B2

(12) United States Patent
Taguchi et al.

(10) Patent No.: US 12,031,844 B2
(45) Date of Patent: Jul. 9, 2024

(54) TILT SENSOR AND DETECTING SYSTEM

(71) Applicant: Nippon Telegraph and Telephone Corporation, Tokyo (JP)

(72) Inventors: Hiroaki Taguchi, Musashino (JP); Masaya Nohara, Musashino (JP); Mikayo Iwata, Musashino (JP); Yuzu Kobayashi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 49 days.

(21) Appl. No.: 18/000,225

(22) PCT Filed: Jun. 2, 2020

(86) PCT No.: PCT/JP2020/021732
§ 371 (c)(1),
(2) Date: Nov. 29, 2022

(87) PCT Pub. No.: WO2021/245777
PCT Pub. Date: Dec. 9, 2021

(65) Prior Publication Data
US 2023/0204355 A1   Jun. 29, 2023

(51) Int. Cl.
*G08B 21/18* (2006.01)
*G01C 9/22* (2006.01)
(Continued)

(52) U.S. Cl.
CPC .............. *G01C 9/22* (2013.01); *G08B 21/18* (2013.01); *H01M 4/466* (2013.01); *H01M 6/04* (2013.01);
(Continued)

(58) Field of Classification Search
CPC .... G01C 9/22; G01C 2009/182; G08B 21/18; H01M 4/466; H01M 6/04; H01M 50/489;
(Continued)

(56) References Cited

U.S. PATENT DOCUMENTS 5,612,679 A * 3/1997 Burgess ................... G01C 9/20
200/185
5,630,280 A * 5/1997 Crossan, Jr. ............. G01C 9/20
33/366.11
(Continued)

OTHER PUBLICATIONS

National Research and Development Agency Public Works Research Institute, Erosion and Sediment Control Research Group, Volcano and Debris Flow Research Team, *Sediment Disaster Occurrence Detection Technology*, PWRI New Technology Showcase 2014 in Tokyo, Sep. 19, 2014, https://www.pwri.go.jp/jpn/results/tec-info/siryou/2014/01_tokyo/pdf/02.pdf, pp. 1-10.
(Continued)

*Primary Examiner* — Hongmin Fan
(74) *Attorney, Agent, or Firm* — Workman Nydegger

(57) ABSTRACT

A tilt sensor includes a notification unit adapted to provide notification about occurrence of tilt; a water storage chamber that contains an electrolytic solution; and a unit cell that includes a positive electrode, a negative electrode, and a separator placed between the positive electrode and the negative electrode. When the water storage chamber tilts, the electrolytic solution is injected into the separator and the unit cell starts generating power and supplies electric power needed to drive the notification unit.

19 Claims, 6 Drawing Sheets

(51) Int. Cl.
  *H01M 4/46*    (2006.01)
  *H01M 6/04*    (2006.01)
  *H01M 50/489*  (2021.01)
  *H01M 50/51*   (2021.01)
  *G01C 9/18*    (2006.01)
  *H01M 4/02*    (2006.01)

(52) U.S. Cl.
  CPC ......... *H01M 50/489* (2021.01); *H01M 50/51* (2021.01); *G01C 2009/182* (2013.01); *H01M 2004/027* (2013.01); *H01M 2220/30* (2013.01)

(58) Field of Classification Search
  CPC ........... H01M 50/51; H01M 2004/027; H01M 2220/30
  See application file for complete search history.

(56) References Cited

U.S. PATENT DOCUMENTS

| | | | |
|---|---|---|---|
| 5,852,878 A * | 12/1998 | Seipp, Jr. | G01C 9/20 33/366.11 |
| 5,937,528 A * | 8/1999 | Shijo | G01C 9/06 33/366.21 |
| 2003/0110652 A1* | 6/2003 | Greway | G01C 9/18 33/366.18 |

OTHER PUBLICATIONS

ABIT Corporation, *Landslide Disaster Sensor "Smakui AL-070"*, literature, Apr. 9, 2020 (reading day), https://www.abit.co.jp/products/al070/, pp. 1-4.

Aqua Power System Japan, *NOPOPO Water Battery for Disaster*, literature, May 20, 2020 (reading day), http://www.aps-j.jp/pdl/NWPx3.pdf, pp. 1.

* cited by examiner

TILT SENSOR AND DETECTING SYSTEM

TECHNICAL FIELD

The present invention relates to a tilt sensor and a detection system.

BACKGROUND ART

Conventionally, alkaline batteries, manganese batteries, air batteries, and other batteries have been used widely as disposable primary batteries.

In recent years, in connection with advancement of IoT (Internet of Things), multipoint sensors used by being installed everywhere in the natural world such as in soil and forests have been under development. Small high-performance lithium-ion batteries for various applications including such small sensors have also become widespread.

Sensors installed in the natural world include a vibration detection sensor using specified low power radio (see Non-Patent Literature 1). The vibration detection sensor described in Non-Patent Literature 1 detects vibrations and detects built-up of sediments or occurrence of tilt by detecting vibrations higher than a predetermined value. There is also an ultra-low power consumption sediment disaster sensor good for five years of continuous use (see Non-Patent Literature 2).

There is a battery that generally works when an electrolytic solution is injected into battery cells before use (see Non-Patent Literature 3). The battery can be stored for an extended period of time in the state where no electrolytic solution is injected.

CITATION LIST

Non-Patent Literature

Non-Patent Literature 1: "Sediment Disaster Detection Technique," Volcano and Debris Flow Research Team, Erosion and Sediment Control Research Group, Public Works Research Institute, found online on an Internet site at https://www.pwri.go.jp/jpn/results/tec-info/siryou/2014/01_tokyo/pdf/02.pdf on May 20, 2020

Non-Patent Literature 2: "Connectable Piles SUMAKUI," ABIT Corporation, found online on an Internet site at https://www.abit.co.jp/products/al070/on May 20, 2020

Non-Patent Literature 3: "Disaster-time Water Battery NOPOPO," Aqua Power System Japan, found online on an Internet site at http://www.aps-j.jp/pdf/NWPx3.pdf on May 20, 2020

SUMMARY OF THE INVENTION

Technical Problem

However, with the sensors described in Non-Patent Literature 1 and Non-Patent Literature 2, mechanisms for detection and reporting are always operating, requiring periodic replacement and the like of internal batteries.

The battery described in Non-Patent Literature 3 is used by manually injecting an electrolytic solution. Therefore, the battery described in Non-Patent Literature 3 cannot supply battery power in situations in which there is no human involvement such as when installed in the natural world.

In this way, no form is available in which power for use in notification is supplied upon detection by a sensor.

The present invention has been made in view of the above circumstances and has an object to provide a technique capable of supplying electric power for use in notification upon detection by a sensor.

Means for Solving the Problem

According to one aspect of the present invention, there is provided a tilt sensor comprising: a notification unit adapted to provide notification about occurrence of tilt; a water storage chamber that contains an electrolytic solution; and a unit cell that includes a positive electrode, a negative electrode, and a separator placed between the positive electrode and the negative electrode, wherein when the water storage chamber tilts, the electrolytic solution is injected into the separator and the unit cell starts generating power and supplies electric power needed to drive the notification unit.

According to another aspect of the present invention, there is provided a detection system comprising: the tilt sensor; a detection server connected to the tilt sensor and adapted to refer to a position where the tilt sensor is installed, wherein the notification unit of the tilt sensor provides notification about a current position of the tilt sensor, and the detection server determines a degree of importance of an alarm according to a difference between the current position of the tilt sensor, notification of which is provided by the tilt sensor, and a position where the tilt sensor is installed.

Effects of the Invention

The present invention can provide a technique capable of supplying electric power for use in notification upon detection by a sensor.

DESCRIPTION OF EMBODIMENTS

Figure 1:
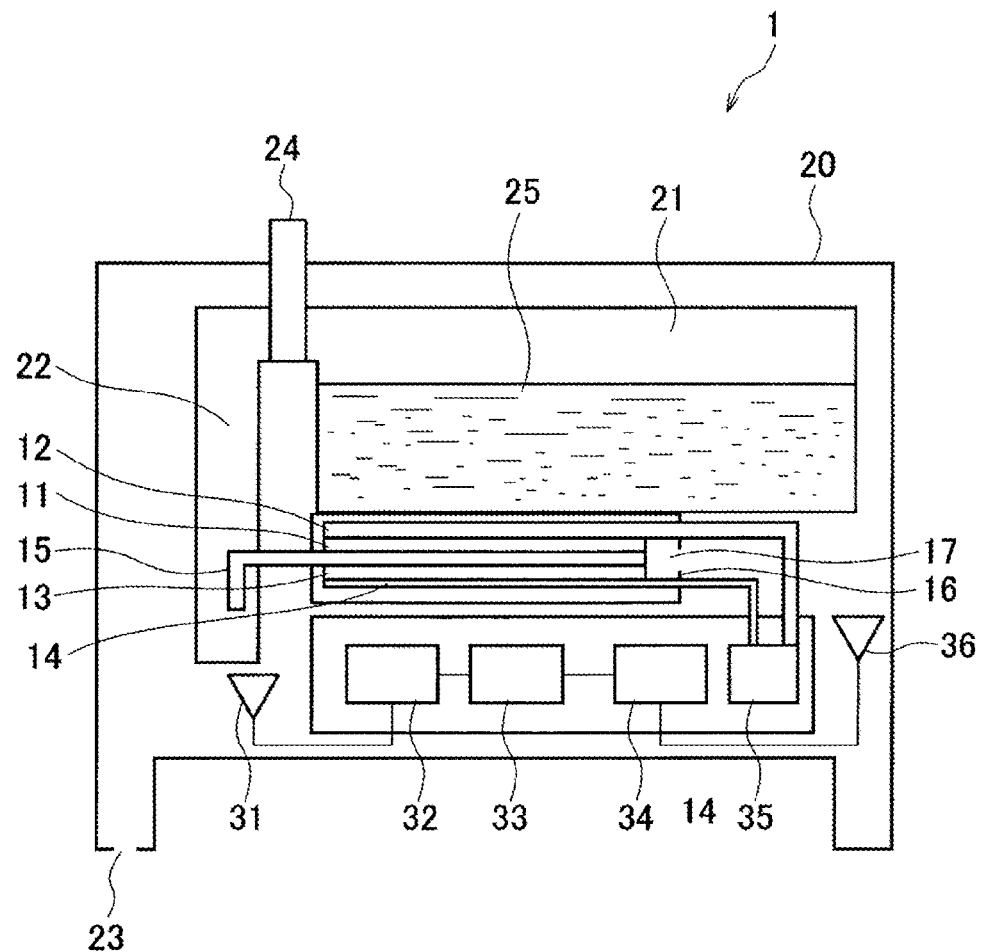
FIG. 1 is a diagram schematically illustrating an internal structure of a tilt sensor according to an embodiment of the present invention in side view.

An embodiment of the present invention will be described below with reference to the accompanying drawings. In the drawings, the same components are denoted by the same reference signs, and description thereof will be omitted.

Tilt Sensor

A tilt sensor 1 according to an embodiment of the present invention will be described with reference to FIG. 1. The tilt sensor 1 includes a unit cell 10, a casing 20, and a notification unit 30. With the tilt sensor 1 according to the embodiment of the present invention, when tilt occurs, an electrolytic solution 25 is injected into a separator 15, causing the unit cell 10 to generate power, and the notification unit 30 provides notification about the tilt using the electric power supplied from the unit cell. In this way, the tilt sensor 1, which is driven by the unit cell 10 that generates power when tilted, does not need to operate in normal times, and can provide notification about operation only in case of an emergency. Consequently, the tilt sensor 1 does not self-discharge during nonoperational hours, and is capable of operating for an extended periods of time in excess of 10 years.

The unit cell 10 is a primary battery. The unit cell 10 includes a positive electrode 11, a positive electrode collector 12, a negative electrode 13, a negative electrode collector 14, the separator 15, and a battery casing 16. The layout and shapes of the positive electrode 11, positive electrode collector 12, negative electrode 13, negative electrode collector 14, separator 15, and battery casing 16 do not matter as long as the battery can operate. For example, the positive electrode 11, the positive electrode collector 12, the negative electrode 13, the negative electrode collector 14, the separator 15, and the battery casing 16 may be shaped as a quadrangular or circular sheet or as a rolled sheet.

The positive electrode collector 12 is connected with the positive electrode 11. The negative electrode collector 14 is connected with the negative electrode 13. The separator 15 is placed between the positive electrode 11 and the negative electrode 13. Some of surfaces of the positive electrode 11 are connected to the separator 15.

The positive electrode 11, the positive electrode collector 12, the negative electrode 13, the negative electrode collector 14, and the separator 15, which are interconnected, are put between top and bottom portions of the battery casing 16, and outer edges are integrated by bonding, thereby hermetically sealing up the interior of the unit cell 10. Available methods for bonding include methods that use heat-sealing or an adhesive, but the method to be used is not specifically limited. For example, when it is difficult to use heat-sealing for bonding, an adhesive is used. In hermetically sealing the interior of the unit cell 10, if part of the outer edges of the unit cell 10 if left unbonded, air can be taken in therethrough.

The separator 15 is exposed from the battery casing 16, extending to a water supply chamber 22 described later. Besides, a battery air vent 17 is formed in the battery casing 16 to take in atmospheric air.

The positive electrode 11 is of a gas diffusion type. Faces of the positive electrode 11 except the face in contact with the separator 15 are exposed to the atmospheric air taken in through the battery air vent 17.

The separator 15 is formed of an insulator having water absorbency. Paper such as a coffee filter or kitchen paper can be used for the separator 15. If a sheet of material that decomposes naturally while keeping strength is used for the separator 15 as with a cellulose separator made of vegetable fiber, environmental burdens will be reduced even if the tilt sensor 1 is not collected after installation.

The casing 20 includes a water storage chamber 21, the water supply chamber 22, a casing air vent 23, and a seal valve 24.

The water storage chamber 21 contains the electrolytic solution 25. The water supply chamber 22 is located adjacent to the water storage chamber 21, and a partition is formed between the water supply chamber 22 and the water storage chamber 21, opening upward. When the water storage chamber 21 is not tilted, the electrolytic solution 25 does not reach the opening and thus does not move from the water storage chamber 21 to the water supply chamber 22.

On the other hand, when the water storage chamber 21 tilts to some extent, the electrolytic solution 25 reaches the opening and thus moves from the water storage chamber 21 to the water supply chamber 22.

The casing air vent 23 is an opening provided in the casing 20. According to the embodiment of the present invention, the casing air vent 23 is formed in a bottom face such that rain and the like will not seep into the casing 20. The atmospheric air taken in through the casing air vent 23 is taken into the unit cell 10 through the battery air vent 17.

To make the electrolytic solution 25 play a water-absorbing role, agar, cellulose, or water absorbing polymer may be included with the electrolytic solution 25.

The casing 20 may have any configuration as long as the unit cell 10, the water storage chamber 21, the water supply chamber 22, the notification unit 30, and the like are held inside the casing 20. To keep the separator 15 from getting wet and causing the unit cell 10 to generate power, preferably the casing 20 has such a configuration that rain and the like will not seep into the casing 20. Preferably, for example, the casing 20 is formed of a laminate film.

If a material that decomposes naturally is used for the battery casing 16 and the casing 20, environmental burdens will be reduced even if the tilt sensor 1 is not collected. Specifically, the casing 20 is formed of any one or more of polylactic acid, polycaprolactone, polyhydroxyalkanoate, polyglycolic acid, denatured polyvinyl alcohol, casein, denatured starch, and the like. Among these materials, preferably the battery casing 16 and the casing 20 are formed of a chemically synthesized organic resin such as plant-derived polylactic acid. The shapes of the battery casing 16 and casing 20 are obtained by processing biodegradable plastics such as the above. Examples of materials applicable to the battery casing 16 and the casing 20 include biodegradable plastics, biodegradable plastic films, paper on which a film of polyethylene or another resin is formed such as used for milk cartons, and agar films, any one or more of which can be used.

The seal valve 24 prevents the electrolytic solution 25 from being supplied to the separator 15 before the tilt sensor 1 is installed in a predetermined position. According to the embodiment of the present invention, the seal valve 24 is formed to close the opening in the partition provided between the water storage chamber 21 and the water supply chamber 22. When the tilt sensor 1 is carried to the predetermined position, the seal valve 24 regulates movement of the electrolytic solution 25 from the water storage chamber 21 to the water supply chamber 22 and thereby prevents malfunctions. After the tilt sensor 1 is installed in the predetermined position, the seal valve 24 is removed, making the electrolytic solution 25 ready to be supplied to the separator 15.

When the water storage chamber 21 tilts, the electrolytic solution 25 is injected into the separator 15 and the unit cell 10 starts generating power and supplies electric power needed to drive the notification unit 30. According to the embodiment of the present invention, when the water storage chamber 21 tilts, the electrolytic solution 25 moves to the water storage chamber 21 through the opening in the partition. The separator 15 exposed to the water supply chamber 22 sucks up the electrolytic solution 25 that has moved to the water storage chamber 21. The electrolytic solution 25 is taken into the separator 15 by capillary action and comes into contact with the positive electrode 11 and the negative electrode 13, thereby causing the unit cell 10 to start generating power. The unit cell 10 supplies electric power to the notification unit 30, allowing the notification unit 30 to provide notification that the tilt sensor 1 has detected tilt.

The notification unit 30 provides notification about occurrence of tilt. In the embodiment of the present invention, description will be given of a case in which the notification unit 30 provides notification about occurrence of tilt to a detection server 102 via a wireless communications network. The wireless communications network is based on mobile communications provided by a mobile communications carrier or on specified low power radio compliant with the ARIB (Association of Radio Industries and Businesses) STD-T67, STD-T93, or STD-T108 standards. Other conceivable notification methods include a method that gives notification by lighting up a lamp provided on the tilt sensor 1 when a tilt occurs.

The notification unit 30 includes a communications antenna 31, a communications circuit 32, an arithmetic circuit 33, a GPS (Global Positioning System) circuit 34, a DCDC (Direct Current to Direct Current) circuit 35, and a GPS receiver circuit 36. The communications antenna 31, the communications circuit 32, the arithmetic circuit 33, the GPS circuit 34, the DCDC circuit 35, and the GPS receiver circuit 36 are driven by the electric power supplied from the unit cell 10 in case of tilt.

The communications antenna 31 is an interface for use to connect to the wireless communication network. The communications circuit 32 communicates with the detection server 102 using the communications antenna 31.

The arithmetic circuit 33 generates transmit data for the detection server 102 and inputs the transmit data to the communications circuit 32. The transmit data contains an identification number of the tilt sensor 1. Besides, the transmit data may contain current positional information about the tilt sensor 1, acquired, for example, from the GPS circuit 34 described later.

The GPS circuit 34 acquires current position of the tilt sensor 1 using radio waves acquired from the GPS receiver circuit described later. For example, when the tilt sensor 1 is moved due to a landslide or the like, if the current position acquired by the GPS circuit 34 is transmitted to the detection server 102, the detection server 102 can grasp the scale and the like of the landslide.

Figure 2:
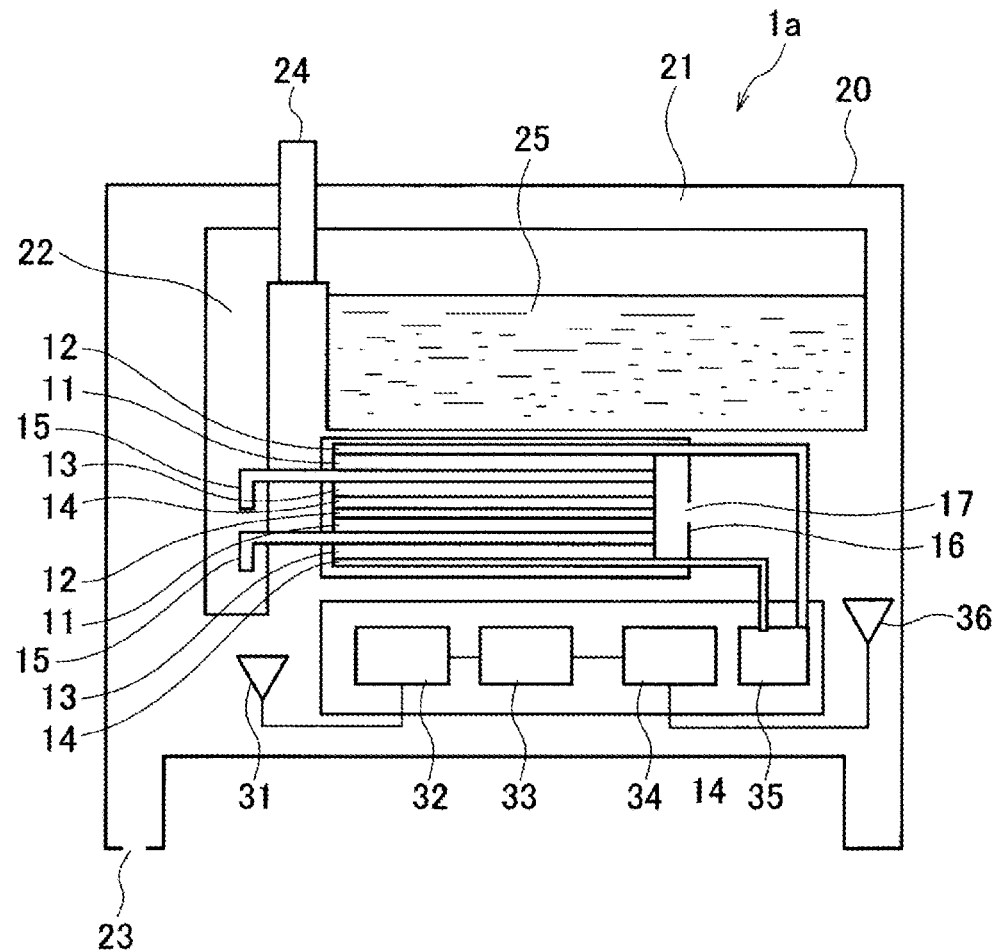
FIG. 2 is a diagram schematically illustrating an internal structure of a tilt sensor according to a variation of the present invention using a side view.

The DCDC circuit 35 converts the electric power supplied from the unit cell 10 into voltages available for use by various circuits. As shown in FIGS. 1 and 2, the positive electrode collector 12 and the negative electrode collector 14 are connected to the DCDC circuit 35. The DCDC circuit 35 converts the electric power supplied from the positive electrode collector 12 and the negative electrode collector 14 into desired voltages and supplies the resulting voltages to various circuits of the notification unit 30. If electric power is supplied at sufficient voltages by a plurality of the unit cells 10 connected in series, requiring no boosting, the DCDC circuit 35 may be omitted. In that case, the electric power supplied from the positive electrode collector 12 and the negative electrode collector 14 is provided to the various circuits of the notification unit 30 directly.

The GPS receiver circuit 36 is an interface adapted to acquire radio waves from GPS satellites. The radio waves acquired from GPS are processed by the GPS circuit 34 to identify the current position of the tilt sensor 1. If the position of the tilt sensor 1 moves due to a landslide or the like, the GPS receiver circuit 36 and the GPS circuit 34, which can identify the position after the movement, are suitable for determining the scale and the like of the landslide. Note that if the arithmetic circuit 33 does not transmit the current position of the tilt sensor 1, the GPS circuit 34 and the GPS receiver circuit 36 may be omitted.

With the tilt sensor 1 according to the embodiment of the present invention, when tilt occurs, the unit cell 10 built into the tilt sensor 1 generates power, allowing the notification unit 30 to give notification. The tilt sensor 1 does not need to operate in normal times, and can operate only in case of an emergency to provide notification about occurrence of tilt. Consequently, the tilt sensor 1 does not self-discharge during nonoperational hours, and can operate for an extended periods of time in excess of 10 years.

Various components of the tilt sensor 1 can be formed of materials that decompose naturally. The tilt sensor 1 formed in this way is suitably applied to disposable sensors installed in nature, such as landslide detection sensors or soil moisture sensors. The unit cell 10 and the casing 20 used for the tilt sensor 1 and formed of naturally decomposable materials are decomposed naturally over time, and thus there is no need to collect the tilt sensor 1. Besides, the tilt sensor 1, which are made of naturally-derived materials or fertilizer components, imposes minimal burdens on the environment even when used in the natural world such as in forests or under the sea as well as in soil.

Whereas in the embodiment of the present invention, description has been given of a case in which the tilt sensor 1 has a single unit cell 10, this is not restrictive. A tilt sensor 1a may include a plurality of the unit cells 10 connected in series. For example, as shown in FIG. 2, the plurality of unit cells 10 may be stacked. The tilt sensor 1a equipped with a plurality of the unit cells 10 can supply sufficient power to the notification unit 30. Whereas in the tilt sensor 1 shown in FIG. 2, the plurality of unit cells 10 are arranged in a vertical direction, the unit cells 10 may be arranged in any direction such as in a horizontal direction.

Detection System

Figure 3:
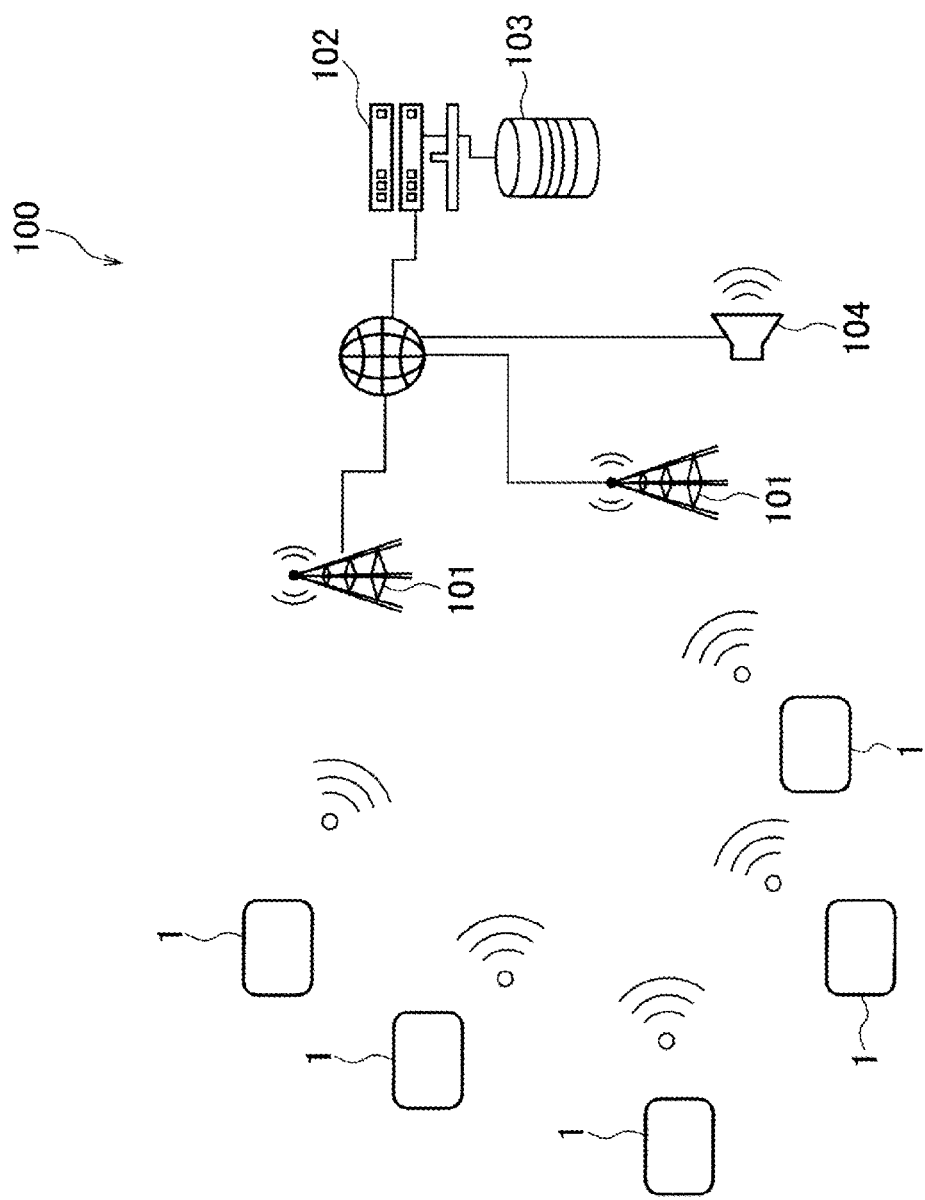
FIG. 3 is a diagram illustrating a system configuration of a detection system according to the embodiment of the present invention.

A detection system 100 according to the embodiment of the present invention will be described with reference to FIG. 3. In the detection system 100, a plurality of the tilt sensors 1 are placed on various slopes prone to landslides due to rainfall and the like.

The detection server 102 monitors and puts together notifications from the tilt sensors 1, identifies the place of occurrence of a landslide, disaster scale, and the like, and provides information to surveillance staff of a local government, administration, or the like. Note that the system configuration shown in FIG. 3 is only exemplary, and is changed as appropriate according to specifications of the wireless communication network, installation positions of the tilt sensor 1, and the like.

The detection system 100 includes a plurality of the tilt sensors 1, a base station 101, a detection server 102, a database server 103, and a transmitting device 104. The tilt sensors 1 communicate with the detection server 102 via the base station 101.

The base station 101 connects to the detection server 102 and wirelessly connects to the tilt sensors 1. The detection server 102 connects to the plurality of tilt sensors 1 via the base station 101. The database server 103 stores the installation positions of the tilt sensors 1, and the detection server 102 can refer to data stored by the database server 103. The transmitting device 104 issues an alarm according to the degrees of importance of the alarm for the detection server 102. The transmitting device 104 is used by surveillance staff of a local government, administration, or the like in an existing alarm system to issue caution recommendations, evacuation orders, or the like to residents. The transmitting device 104 can be existing disaster radio or other broadcasting facilities, an outdoor speaker, an emergency e-mail sender, or the like.

For example, the detection server 102 connects to the database server 103 and to each of the tilt sensors 1 and refers to the installation positions of the tilt sensor 1. The notification unit 30 of the tilt sensor 1 detects tilt and provides notification of the current position of the tilt sensor 1. The detection server 102 determines the degree of importance of an alarm according to a difference between the current position of the tilt sensor 1, notification of which is provided by the tilt sensor 1, and the installation position of the tilt sensor 1. The larger the difference between the current position of the tilt sensor 1 and the installation position of the tilt sensor 1, the higher the degree of importance of the alarm; and the smaller the difference, the lower the degree of importance of the alarm.

Also, the detection server 102 determines the degree of importance of an alarm according to the number of tilt sensors 1 that provide notification about occurrence of tilt. The larger the number of tilt sensors 1 that provide notification about occurrence of tilt, the higher the degree of importance of the alarm because it is estimated that disasters such as landslides have occurred in a wider area; and the smaller the number, the lower the degree of importance of the alarm.

Furthermore, the detection server 102 can determine the degree of importance of an alarm according to the amount of precipitation in the installation position of the tilt sensor 1. The larger the amount of precipitation, the higher the degree of importance of the alarm; and the smaller the amount of precipitation, the lower the degree of importance of the alarm.

Figure 4:
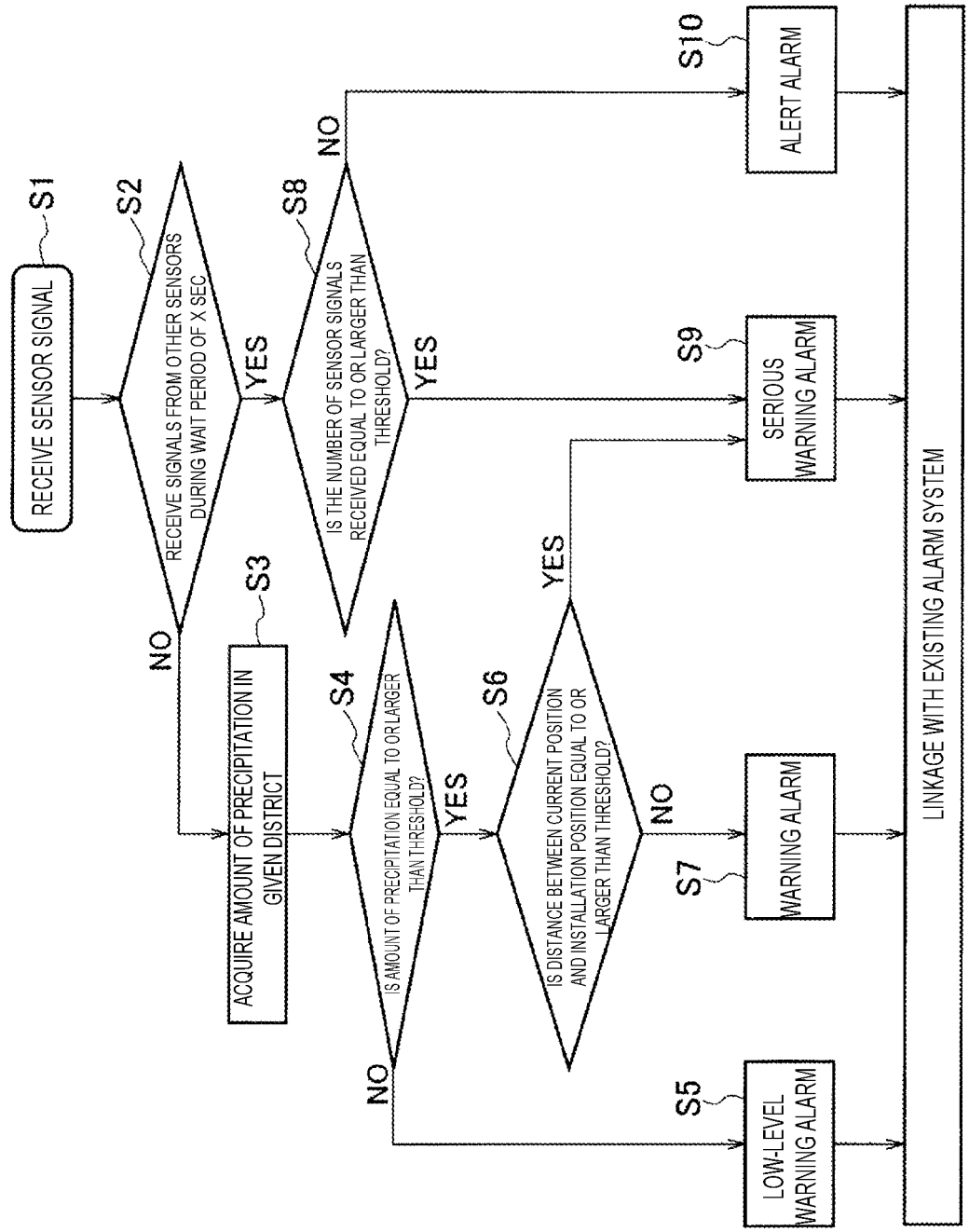
FIG. 4 is a flowchart illustrating a process of a detection server according to the embodiment of the present invention.

A process of the detection server 102 will be described with reference to FIG. 4. According to the process shown in FIG. 4, when a signal is received from a tilt sensor 1, a warning level of the alarm is notified to an existing alarm system by being identified based on signals from the other tilt sensors 1, the amounts of rainfall, the travel distances of the tilt sensors 1, and the like. Note that the process shown in FIG. 4 is only exemplary and is not restrictive.

First, in step S1, the detection server 102 receives a signal indicating that tilt has occurred, from a tilt sensor 1. In step S2, the detection server 102 waits for signals from other tilt sensors 1 for a predetermined time period. If no signal is received from the other tilt sensors 1, the detection server 102 goes to step S3. If a signal is received from any of the other tilt sensors 1, the detection server 102 goes to step 8.

In step S3, with reference to the database server 103 and the like, the detection server 102 identifies the installation position of the tilt sensor 1 from which a signal has been received in step S1, and then acquires the amount of precipitation for the latest predetermined time period in a district including the position, from a weather server (not shown) or the like. If the amount of precipitation acquired in step S3 is not equal to or larger than a threshold in step S4, the detection server 102 recognizes occurrence of a low-level warning alarm in step S5. If the amount of precipitation acquired in step S3 is equal to or larger than the threshold in step S4, the detection server 102 goes to step S6.

In step S6, the detection server 102 compares the installation position of the tilt sensor 1 from which a signal has been received in step S1 with the current position of the tilt sensor 1. If the difference in distance is equal to or smaller than a threshold, the detection server 102 recognizes occurrence of a warning alarm in step S7. If the difference in distance is equal to or larger than the threshold, the detection server 102 recognizes occurrence of a serious warning alarm in step S9.

If it is found in step S8 that the number of signals received during the wait in step S1 is equal to or larger than a threshold, it is considered that landslides have occurred in a wide area, and thus the detection server 102 recognizes occurrence of a serious warning alarm in step S9. If it is found in step S8 that the number of signals received during the wait in step S1 is not equal to or larger than the threshold, it is considered that the scope of the landslides is limited, and thus the detection server 102 recognizes occurrence of an alert alarm in step S10.

If occurrence of an alarm is recognized in step S5, S7, S9, or S10, the recognized alarm can be notified to an existing alarm system. The existing alarm system can inform residents and the like according to predetermined rules via the transmitting device 104.

Note that measures to be taken by the existing alarm system in response to the various warning alarms are determined appropriately according to operating policies of the surveillance staff. As an example, when a low-level warning alarm occurs, a caution recommendation is issued on a management screen for the surveillance staff. When a warning alarm occurs, a caution recommendation is issued to plural members of the surveillance staff. When a serious warning alarm occurs, an evacuation order is issued to the residents via the transmitting device 104. When an alert alarm occurs, a caution recommendation is issued to the residents via the transmitting device 104.

The detection system 100 configured as described above makes it possible to identify the scope of the disaster, the scale of the disaster, and the like based on the signals from the plurality of tilt sensors 1 and inform the existing alarm system. The tilt sensor 1 according to the embodiment of the present invention, lends itself to easy maintenance and management because electric power is supplied only upon occurrence of tilt to provide information of the tilt, and thus can be installed in the natural world in large numbers. Besides, the tilt sensor 1, which is formed of materials that decompose naturally, does not impose burdens on the natural world even if not collected.

Configuration and Electrode Reaction of Unit Cell

Now, components of the unit cell 10 will be described.

The positive electrode 11 is formed of a conducting material, such as a carbon material, used for positive electrodes of typical metal-air batteries. The positive electrode 11 can be made by a known process of forming carbon powder using a binder. With a primary battery, because it is important to generate a large number of reaction sites inside the positive electrode 11, desirably the positive electrode 11 has a large specific surface area. When the positive electrode 11 is made by forming carbon powder into pellets using a binder, if the specific surface area is increased, binding strength of the carbon powder is decreased, deteriorating a structure, thereby making it difficult for the positive electrode 11 to discharge stably, and resulting in reduced discharge capacity. In contrast, for example, when the positive electrode 11 has a three-dimensional network structure, there is no need to use a binder for the positive electrode 11, and the discharge capacity can be increased. Besides, the positive electrode 11 may support a catalyst. Although not specifically limited, preferably the catalyst is made of at least one metal selected from Fe, Mn, Zn, Cu, and Mo; or a metal oxide composed of at least one metal selected from Ca, Fe, Mn, Zn, Cu, and Mo. Among these metals, preferably the catalyst is made of one metal, an oxide of one metal, or a complex oxide of two or more metals, selected from Fe, Mn, and Zn.

The negative electrode 13 is formed of a negative active material. The negative electrode 13 is formed of one or more metals selected from magnesium, zinc, aluminum, and iron; or formed of an alloy composed principally of one or more metals selected from magnesium, zinc, aluminum, and iron. The negative electrode 13 can be formed by a typical method that involves, for example, forming a metal or alloy plate or foil into a predetermined shape.

The electrolytic solution 25 contains an electrolyte. The electrolyte is not specifically limited as long as the electrolyte allows metal ions and hydroxide ions to move between the positive electrode 11 and the negative electrode 13. Preferably the electrolyte is made, for example, of magnesium acetate, sodium chloride, or potassium chloride. Out of concern for the environment, preferably the electrolytic solution 25 is neutral.

Known materials can be used for the positive electrode collector 12. A plate made, for example, of one or more of a carbon sheet, carbon cloth, Fe, Cu, and Al can be used for the positive electrode collector 12. Known materials can also be used for the negative electrode collector 14. When metal is used for the negative electrode 13, a terminal may be taken directly out of the negative electrode 13 instead of providing the unit cell 10 with a negative electrode collector.

Now, description will be given of electrode reactions on the positive electrode 11 and the negative electrode 13 in a primary battery that uses magnesium metal for the negative electrode 13. When oxygen in the air comes into contact with the electrolyte, a positive electrode reaction given by expression (1) proceeds on a surface of the positive electrode 11 having conductivity. On the other hand, a negative electrode reaction given by expression (2) proceeds on a surface of the negative electrode 13 placed in contact with the electrolyte supplied by the separator 15. Electrons emitted from the magnesium making up the negative electrode 13 dissolve as magnesium ion in the electrolyte.

The positive electrode reaction and the negative electrode reaction allow the unit cell 10 to discharge. As can be seen from expression (3), all the reactions produce (precipitate) magnesium hydrate. Theoretical electromotive force is approximately 2.7 V.

Math. 1

$$1/2 O_2 + H_2O + 2e^- \rightarrow 2OH^- \quad \text{Exp. (1)}$$

$$Mg \rightarrow Mg^{2+} + 2e^- \quad \text{Exp. (2)}$$

$$Mg + 1/2 O_2 + H_2O + 2e^- \rightarrow Mg(OH)_2 \quad \text{Exp. (3)}$$

Method for Producing Unit Cell

A method for producing the unit cell 10 will be described. According to the embodiment of the present invention, the unit cell 10 is made using carbon nanofibers for the positive electrode 11.

First, a method for making the positive electrode 11 will be described. A commercially available carbon nanofiber sol [dispersion medium: 0.4 wt % of water (H₂O) produced by Sigma-Aldrich] was put in a test tube, and was completely frozen by immersing the test tube in liquid nitrogen for 30 minutes. After the carbon nanofiber sol was completely frozen, the frozen carbon nanofiber sol was taken out to a recovery flask and dried by a freeze dryer (produced by Tokyo Rikakikai Co., Ltd.) in a vacuum of 10 Pa or below, thereby obtaining a stretchable bicontinuous body having a three-dimensional network structure, including a carbon nanosheet.

Next, a method for producing the negative electrode 13 will be described. The negative electrode 13 was made by cutting a 20-mm by 20-mm square piece, part of which was provided with a collector tab, out of a commercially available magnesium alloy sheet AZ31B (300 μm in thickness; produced by Nippon Kinzoku Co., Ltd.) using scissors.

The electrolytic solution 25 was created by dissolving sodium chloride (NaCl produced by Kanto Chemical Co., Inc.) in pure water at a concentration of 1 mol/L. The separator 15 was created by cutting a cellulose separator (produced by Nippon Kodoshi Corp.) for batteries into a 20-mm by 20-mm square shape.

Carbon cloth was used for the positive electrode collector 12 by cutting a 20-mm by 20-mm square piece, part of which was provided with a collector tab. The positive electrode 11 was created by punching the carbon cloth into a circular shape with a diameter of 17 mm.

As a material for the battery casing 16, film sheet ECOLOJU (Mitsubishi Plastics, Inc.) was used. The film sheet was cut into two sheets measuring 30-m by 30-mm in planar view, and one of the sheets was used as a part of the casing on the side of the positive electrode 11 and the other sheet was used as a part of the casing on the side of the negative electrode 13.

The negative electrode 13 and the separator 15 were placed on the part of the casing on the side of the negative electrode 13, the positive electrode 11, the positive electrode collector 12, and the part of the casing on the side of the positive electrode 11 were put thereon in order, and the outer edges of the two casing halves were heat-sealed airtight by heating at 130 degrees C. with a sealer.

Finally, the unit cell 10 was laminated. In so doing, part (approximately 10 mm) of the outer edge of the casing on the side of the unit cell 10 was left unsealed to provide the battery air vent 17.

Gross weight of the unit cell 10 obtained in this way was approximately 2 g.

Production of Casing

A method for producing the casing 20 will be described. As shown in FIG. 1, the casing 20 contains the unit cell 10, the notification unit 30, the water storage chamber 21, and the water supply chamber 22. The casing 20 is designed such that these components will fit in a 100-mm by 100-mm by 50-mm space. The casing 20 is created by melting PLA (Polylactic Acid) filaments (produced by Raise 3D Technologies, Inc.) by FFF (Fused Filament Fabrication) method using Raise3D Pro2 (produced by Raise 3D Technologies, Inc.) and laminating the melted PLA filaments. The PLA filaments are formed of polylactic acid. As described above, polylactic acid is a material that decomposes naturally, and thus does not impose significant burdens on the environment.

Production of Notification Unit

A method for producing the notification unit 30 will be described. LoRa/GPS Tracker LT-100 (produced by GISUPPY, Inc.) is modified such that LoRa/GPS Tracker LT-100 can be powered on, receive GPS, and transmit radio waves when the unit cell 10 is operated. LoRa/GPS Tracker LT-100 is housed in the casing 20 with its exterior removed. LoRa/GPS Tracker LT-100 is connected to the positive electrode collector 12 and the negative electrode collector 14 of an unused unit cell 10, specifically, a unit cell 10 in which the electrolytic solution 25 has not been injected into the separator 15.

Note that the cell voltage, which is assumed to be around 1.5 V, is boosted to 3.7 V by the DCDC circuit 35 before use.

Evaluation of Sensor

Figure 5:
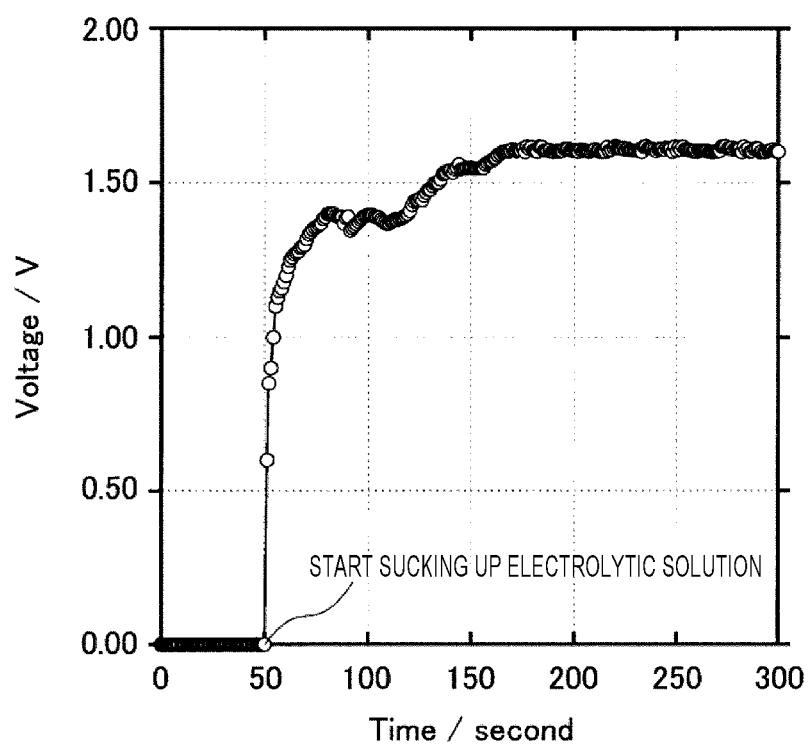
FIG. 5 is a diagram illustrating changes in battery voltage of the tilt sensor with time according to the embodiment of the present invention.
Figure 6:
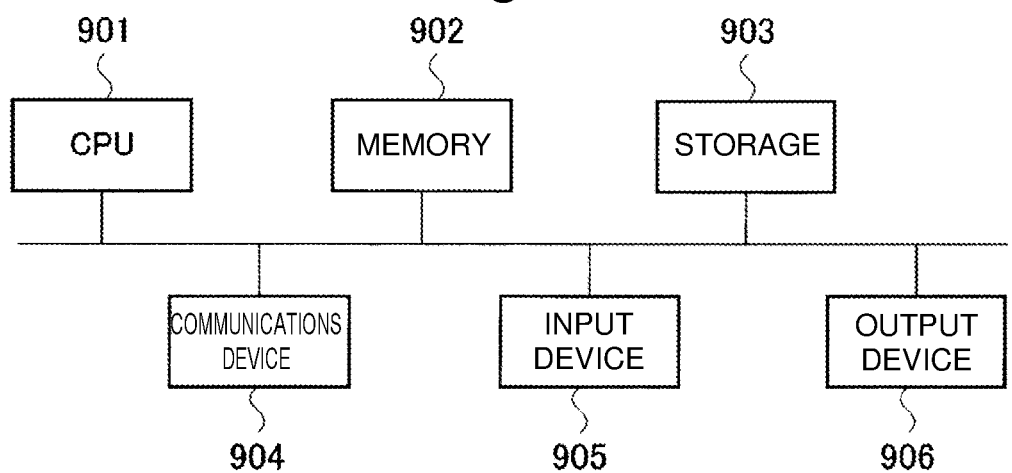
FIG. 6 is a diagram illustrating a hardware configuration of a computer used for the detection server.

First, the seal valve 24 installed in the casing 20 is removed, and the casing 20 is tilted 45 degrees, thereby causing 1 mol/l of NaCl water solution to be sucked as an electrolytic solution 25 into the separator 15. Voltage changes between the positive electrode 11 and the negative electrode 13 on this occasion are shown in FIG. 5.

When the electrolytic solution 25 was sucked up from the separator 15, the voltage rose and stabilized after approximately 200 seconds from the start of sucking. At this time, the voltage was around 1.6 V. When a stable voltage became available, transmission of radio waves from the notification unit 30 was confirmed by a receiver. Besides, the notification unit 30 transmitted a unique ID and GPS positional information and reception of both pieces of information was also confirmed by the receiver. The receiver was LoRa Gateway ES920LRGW (produced by EASEL Inc.), which was capable of receiving the radio waves used by LoRa/GPS Tracker LT-100.

Note that sensitivity to angles can be changed by adjusting a liquid level of the water storage chamber 21. Desirably, a water volume large enough to supply a sufficient amount of water to the water supply chamber 22 is provided to allow the separator 15 to suck up water by capillary action.

The sensor was installed in soil after the end of operation, and decomposition of the casing was visually confirmed in approximately two month except for a commercially available circuit unit. It was indicated that the sensor was metabolized and decomposed by microorganisms in soil.

With the tilt sensor 1 according to the embodiment of the present invention, as the casing 20 tilts, the electrolytic solution 25 stored in the water storage chamber 21 is injected into the separator 15, causing the unit cell 10 to generate power, thereby putting the notification unit 30 into operation, and thereby making it possible to provide notification of the tilt. The unit cell 10 of the tilt sensor 1 does not need to operate in normal times, and operates only when tilt occurs, making it necessary for the notification unit 30 to give notification. Thus, the unit cell 10 does not self-discharge during nonoperational hours, and can operate for an extended periods of time in excess of, for example, 10 years.

The casing 20 and other components are formed of naturally decomposable materials, and thus do not need to be collected even if installed in the natural world, and environmental burdens are not significant. By installing the tilt sensor 1 in the natural world and causing the notification from the tilt sensor 1 to be received by the detection server 102 installed at a location away from the tilt sensor 1, it is possible to detect a disaster such as a landslide occurring at a distant location. Also, by installing a plurality of the tilt sensors 1 in the natural world and causing the detection server 102 to receive notifications about tilt from the tilt sensors 1, it is possible to grasp disaster scales and the like without going to the disaster sites. Besides, by referring to weather information such as the amounts of rainfall in the installation locations of the tilt sensors 1, it is possible to recognize disaster warning levels and issue alarms to the residents and the like.

A general-purpose computer system is used for the detection server 102 and database server 103 according to the present embodiment described above, where the computer system includes, for example, a CPU (Central Processing Unit: processor) 901, a memory 902, a storage 903 (HDD: Hard Disk Drive or SSD: Solid State Drive), a communications device 904, an input device 905, and an output device 906. On the computer system, functions of the detection server 102 and database server 103 are implemented when the CPU 901 executes predetermined programs loaded into the memory 902.

Note that the detection server 102 and the database server 103 may each be implemented by a single computer or by plural computers. Alternatively, the detection server 102 and the database server 103 may each be a virtual machine implemented on a computer.

The respective programs of the detection server 102 and the database server 103 can be stored in a computer-readable recording medium such as an HDD, an SSD, a USB (Universal Serial Bus) memory, a CD (Compact Disc), a DVD (Digital Versatile Disc), or the like, or delivered through a network.

Note that the present invention is not limited to the embodiment described above and that various changes can be made without departing from the scope of the present invention.

REFERENCE SIGNS LIST

1 Tilt sensor
10 Unit cell
11 Positive electrode
12 Positive electrode collector
13 Negative electrode
14 Negative electrode collector
15 Separator
16 Battery casing
17 Battery air vent
20 Casing
21 Water storage chamber
22 Water supply chamber
23 Casing air vent
24 Seal valve
25 Electrolytic solution
30 Notification unit
31 Communications antenna
32 Communications circuit
33 Arithmetic circuit
34 GPS circuit
35 DCDC circuit
36 GPS receiver circuit
100 Detection system
101 Base station
102 Detection server
103 Database server
104 Transmitting device
901 CPU
902 Memory
903 Storage
904 Communications device
905 Input device
906 Output device

The invention claimed is:

1. A tilt sensor comprising:
a notification unit adapted to provide notification about occurrence of tilt;
a water storage chamber that contains an electrolytic solution; and
a unit cell that includes a positive electrode, a negative electrode, and a separator placed between the positive electrode and the negative electrode, wherein
when the water storage chamber tilts, the electrolytic solution is injected into the separator and the unit cell starts generating power and supplies electric power needed to drive the notification unit.

2. The tilt sensor according to claim 1, comprising a plurality of the unit cells connected in series.

3. The tilt sensor according to claim 1, further comprising a seal valve adapted to prevent the electrolytic solution from being supplied to the separator before the tilt sensor is installed in a predetermined position, wherein
when the tilt sensor is installed in the predetermined position, the seal valve is removed, making the electrolytic solution ready to be supplied to the separator.

4. The tilt sensor according to claim 1, wherein the negative electrode is formed of one or more metals selected from magnesium, zinc, aluminum, and iron; or formed of an alloy composed principally of one or more metals selected from magnesium, zinc, aluminum, and iron.

5. The tilt sensor according to claim 1, wherein the separator is formed of an insulator having water absorbency.

6. A detection system comprising:
the tilt sensor according to claim 1; and
a detection server connected to the tilt sensor and adapted to refer to a position where the tilt sensor is installed,
wherein the notification unit of the tilt sensor provides notification about a current position of the tilt sensor, and
the detection server determines a degree of importance of an alarm according to a difference between the current position of the tilt sensor, notification of which is provided by the tilt sensor, and a position where the tilt sensor is installed.

7. The detection system according to claim 6, wherein the detection server determines the degree of importance of an alarm according to the number of the tilt sensors that provide notification about occurrence of tilt.

8. The detection system according to claim 6, wherein the detection server further determines the degree of importance of an alarm according to an amount of precipitation in the position where the tilt sensor is installed.

9. The tilt sensor according to claim 2, further comprising a seal valve adapted to prevent the electrolytic solution from being supplied to the separator before the tilt sensor is installed in a predetermined position, wherein
when the tilt sensor is installed in the predetermined position, the seal valve is removed, making the electrolytic solution ready to be supplied to the separator.

10. The tilt sensor according to claim 2, wherein the negative electrode is formed of one or more metals selected from magnesium, zinc, aluminum, and iron; or formed of an alloy composed principally of one or more metals selected from magnesium, zinc, aluminum, and iron.

11. The tilt sensor according to claim 3, wherein the negative electrode is formed of one or more metals selected from magnesium, zinc, aluminum, and iron; or formed of an alloy composed principally of one or more metals selected from magnesium, zinc, aluminum, and iron.

12. The tilt sensor according to claim 2, wherein the separator is formed of an insulator having water absorbency.

13. The tilt sensor according to claim 3, wherein the separator is formed of an insulator having water absorbency.

14. The tilt sensor according to claim 4, wherein the separator is formed of an insulator having water absorbency.

15. A detection system comprising:
the tilt sensor according to claim 2; and
a detection server connected to the tilt sensor and adapted to refer to a position where the tilt sensor is installed,
wherein the notification unit of the tilt sensor provides notification about a current position of the tilt sensor, and
the detection server determines a degree of importance of an alarm according to a difference between the current position of the tilt sensor, notification of which is provided by the tilt sensor, and a position where the tilt sensor is installed.

16. A detection system comprising:
the tilt sensor according to claim 3; and
a detection server connected to the tilt sensor and adapted to refer to a position where the tilt sensor is installed,
wherein the notification unit of the tilt sensor provides notification about a current position of the tilt sensor, and
the detection server determines a degree of importance of an alarm according to a difference between the current position of the tilt sensor, notification of which is provided by the tilt sensor, and a position where the tilt sensor is installed.

17. A detection system comprising:
the tilt sensor according to claim 4; and
a detection server connected to the tilt sensor and adapted to refer to a position where the tilt sensor is installed,
wherein the notification unit of the tilt sensor provides notification about a current position of the tilt sensor, and
the detection server determines a degree of importance of an alarm according to a difference between the current position of the tilt sensor, notification of which is provided by the tilt sensor, and a position where the tilt sensor is installed.

18. A detection system comprising:
the tilt sensor according to claim 5; and
a detection server connected to the tilt sensor and adapted to refer to a position where the tilt sensor is installed,
wherein the notification unit of the tilt sensor provides notification about a current position of the tilt sensor, and
the detection server determines a degree of importance of an alarm according to a difference between the current position of the tilt sensor, notification of which is provided by the tilt sensor, and a position where the tilt sensor is installed.

19. The detection system according to claim 7, wherein the detection server further determines the degree of importance of an alarm according to an amount of precipitation in the position where the tilt sensor is installed.

* * * * *